US006213244B1

(12) United States Patent
Waggoner et al.

(10) Patent No.: US 6,213,244 B1
(45) Date of Patent: Apr. 10, 2001

(54) MULTI FUNCTION CONTROL MECHANISM

(75) Inventors: Van Earl Waggoner; William Damm Zopf; Douglas Brian Stickney, all of Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/430,553

(22) Filed: Oct. 29, 1999

(51) Int. Cl.[7] .................................................... B60K 26/00

(52) U.S. Cl. .......................... 180/333; 180/315; 180/332; 74/471 XY; 414/685

(58) Field of Search .................................... 180/315, 332, 180/333; 74/471 XY; 414/685; 137/636.2

(56) References Cited

U.S. PATENT DOCUMENTS

| | | | | |
|---|---|---|---|---|
| 3,131,574 | | 5/1964 | Clingerman | 74/471 |
| 3,388,609 | | 6/1968 | Miller | 74/471 |
| 4,133,218 | | 1/1979 | Carter | 74/471 |
| 4,140,200 | * | 2/1979 | Tucek | 180/77 |
| 4,187,737 | | 2/1980 | Mori et al. | 74/471 |
| 4,283,964 | | 8/1981 | Grattapaglia | 74/471 |
| 4,422,345 | | 12/1983 | Green | 74/471 |
| 4,526,055 | | 7/1985 | Batchelor et al. | 74/471 |
| 4,736,647 | * | 4/1988 | Shimoie et al. | 74/471 XY |
| 4,938,091 | | 7/1990 | Waggoner et al. | 74/471 |
| 4,978,273 | | 12/1990 | Radke et al. | 414/697 |
| 5,110,253 | * | 5/1992 | Ernst et al. | 414/694 |
| 5,232,057 | * | 8/1993 | Renard | 172/812 |
| 5,288,198 | * | 2/1994 | Mozingo | 414/685 |
| 5,316,435 | * | 5/1994 | Mozingo | 414/685 |
| 5,360,312 | * | 11/1994 | Mozingo | 414/685 |
| 5,429,037 | | 7/1995 | Weber | 91/522 |
| 5,480,276 | * | 1/1996 | Mozingo | 414/685 |
| 5,497,847 | * | 3/1996 | Ota et al. | 180/333 |

* cited by examiner

*Primary Examiner*—Brian L. Johnson
*Assistant Examiner*—Deanna Draper

(57) ABSTRACT

Three independent functions are controlled from a single control lever. The lever is mounted on a universal joint having a slip yoke, a flanged yoke and a cross member extending between the two yokes and defining a first transverse pivot axis and a second transverse pivot axis. The slip yoke is provided with first and second ball joints located in the same plane as the cross member. The first function is controlled by the fore-and-aft movement of the control lever pivoting the slip yoke about the first transverse pivot axis moving the first ball joint up and down. The first ball joint is coupled to a first link that moves the first hydraulic control valve. The second function is controlled by the side-to-side movement of the control lever. Such a side-to-side movement pivots the slip yoke about the second transverse pivot axis moving the second ball joint and second link positioning the second hydraulic control valve. The third function is controlled by the twisting movement of the control lever. A strap is welded to the control lever and is provided with a third ball joint that is coupled to a third linkage for manipulating the third hydraulic control valve. The third linkage is provided with a rod, a bell crank and a third link.

19 Claims, 3 Drawing Sheets

MULTI FUNCTION CONTROL MECHANISM

BACKGROUND OF THE INVENTION

1. Field of the Invention

The invention is directed to a multi function control mechanism for a work vehicle which independently positions hydraulic control valves through the manipulation of a single control lever.

2. Description of the Prior Art

In operating work vehicles such as crawler dozers, the operator controls a plurality of work operations through manipulating various control levers that control the positioning of hydraulic control valves and thereby the flow of hydraulic fluid to hydraulic cylinders of a work implement. It is desirable to control a number of work operations from a single control lever. Typically three function control levers have a T-bar shaped control handle that can be moved through orthogonal control arcs to operate the first two functions and twisted to control a third function. It is desirable that the control lever be manipulated to operate each of the functions independently or in unison with the other functions.

Such three function control levers are used on crawler dozers manufactured and marketed by the assignee of the present application, for controlling the position of the working blade. These control levers are operatively coupled to the supporting frame of the dozer by a series of universal joints and/or ball joints. See U.S. Pat. Nos. 3,131,574, 3,388,609 and 4,938,091 all of which are assigned to the assignee of the present patent application. U.S. Pat. Nos. 4,536,055, 4,978,273 and 5,429,037 disclose other examples of three function control mechanisms.

SUMMARY OF THE INVENTION

It is an object of the present invention to provide a control mechanism wherein cross talk between controlled functions and the dead band when controlling a specific function are minimized.

Three independent functions are controlled from a single control lever. The lever is mounted on a universal joint having a slip yoke, a flanged yoke and a cross member extending between the two yokes and defining a first transverse pivot axis and a second transverse pivot axis. The slip yoke is provided with a first mounting assembly in the same plane as the cross member and a second mounting assembly also in the same plane as the cross member.

The first function is controlled by the fore-and-aft movement of the control lever. Such a fore-and-aft movement pivots the slip yoke about the first transverse pivot axis moving the first mounting assembly which is coupled to a first link. The first link in turn moves a first hydraulic control valve. The first hydraulic control valve is shifted along a first shift axis. The first hydraulic control valve is provided with first control valve ball joint that is coupled to the first link. The first control valve ball joint is in line with the first shift axis.

The second function is controlled by the side-to-side movement of the control lever. Such a side-to-side movement pivots the slip yoke about the second transverse pivot axis moving the second mounting assembly which is coupled to a second link. The second link in turn moves a second hydraulic control valve. The second hydraulic control valve is shifted along a second shift axis. The second hydraulic control valve is provided with second control valve ball joint that is coupled to the second link. The second control valve ball joint is in line with the second shift axis.

The third function is controlled by the twisting movement of the control lever. A downwardly extending strap is welded to the control lever and is provided with a third mounting assembly. The third mounting assembly is coupled to a third linkage for controlling the movement of the third hydraulic control valve. The third linkage comprises a rod coupled to the third mounting assembly and extending to the first arm of a bell crank. The second arm of the bell crank is coupled to a third link that is pinned to the third hydraulic control valve.

DETAILED DESCRIPTION

Figure 1:
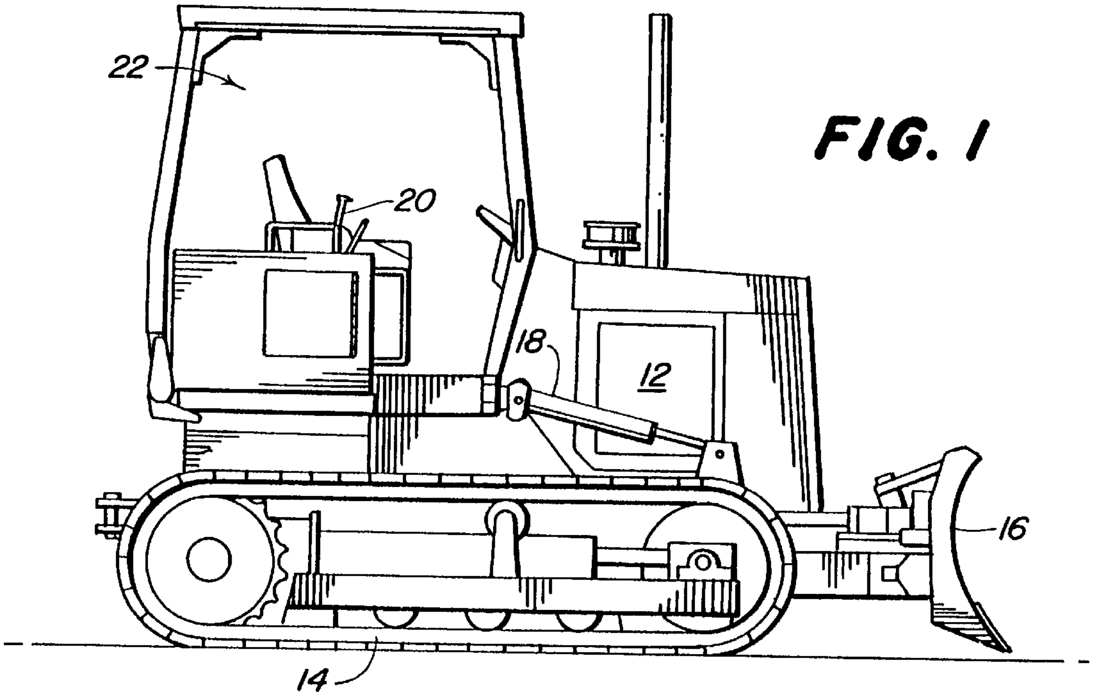
FIG. 1 is a side view of a crawler dozer.
Figure 2:
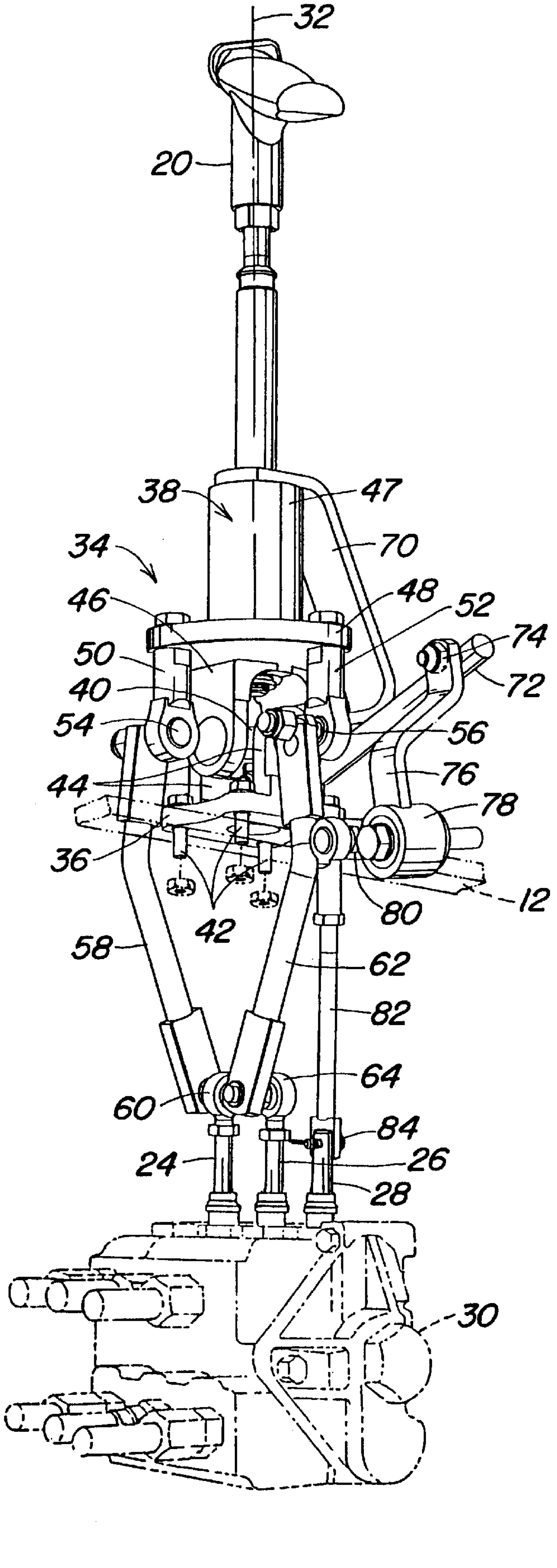
FIG. 2 is an upward perspective view of the three function control mechanism.
Figure 3:
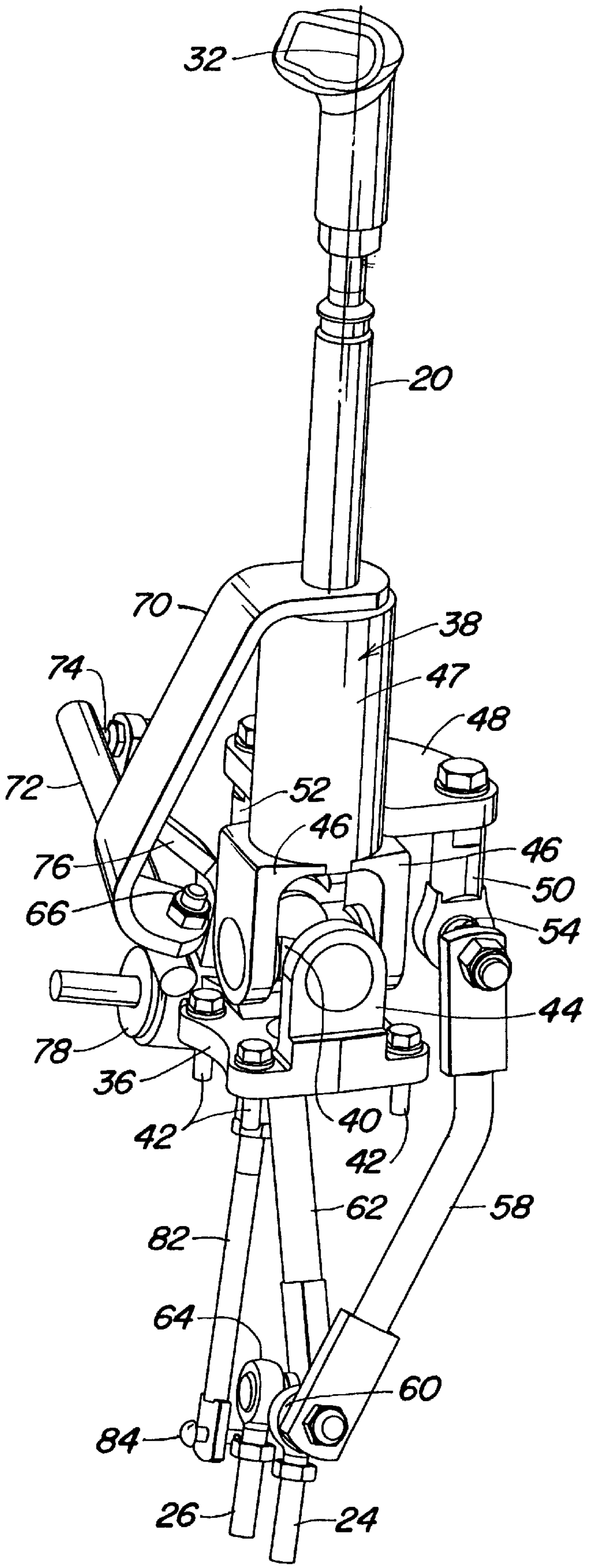
FIG. 3 is a downward perspective view of the three function control mechanism.

FIG. 1 illustrates a work vehicle in the form of a crawler dozer 10. The crawler dozer 10 is provided with a supporting frame 12 and ground engaging tracks 14. Ground engaging wheels may be used in place of ground engaging tracks 14. The dozer 10 is provided with a working member or blade 16 the position of which is controlled by hydraulic cylinders. More specifically, the blade is raised and lowered by hydraulic cylinders 18 the position of which are controlled by the operator through T-bar control lever 20 located in operators area 22. By manipulating the control lever 20 fore-and-aft the blade 16 is raise and lowered. To tilt the blade 16 about the longitudinal axis, the control lever 20 is manipulated side-to-side which drives another hydraulic cylinder tilting the blade. To angle the blade 16 about a lateral axis the control lever 20 is twisted. In the illustrated embodiment, the three function control mechanism is described as being located on a crawler dozer, to which it is particularly well suited, however the invention is not so limited and may be applied to other control systems needing single lever three function control.

The three function control mechanism controls the positioning of three hydraulic control valves 24, 26 and 28 located in valve stack 30. The first hydraulic control valve 24 is the raise/lower control valve and is manipulated by moving the control lever 20 fore-and-aft to raise and lower the dozer blade 16. The second hydraulic control valve 26 is the tilt control valve and is manipulated by moving the control lever 20 side-to-side to tilt the dozer blade 16 about the vehicle's longitudinal axis. The third hydraulic control valve 28 is the angle control valve and is manipulated by twisting the control lever to angle the blade 16 about a vertical axis.

The control lever 20 defines a lever axis 32. The lever 20 is coupled to a universal joint 34. The universal joint is formed from a flanged yoke 36 and a slip yoke 38 which are joined together by a cross member 40. The flange yoke 36 is mounted to supporting frame 12 by mounting bolts 42. The flanged yoke 36 is provided with two upwardly extending ears 44 which are parallel to the control lever axis 32 and to which the cross member 40 is pivotally secured thereby defining a first transverse pivot axis. The slip yoke 38 is provided with two downwardly extending ears 46 that are parallel to the control lever axis 32 and are pivotally connected to the cross member 40 thereby defining a second transverse pivot axis that is orthogonal to the first transverse pivot axis of the flanged yoke 36. Both transverse pivot axes intersect and are perpendicular to the control lever axis 32.

The slip yoke 36 defines a sleeve 47 the interior of which is provided with two bearing races, not shown, which receive the control lever 20 so that it can be twisted in the sleeve 47. The slip yoke is also provided with a radially extending flange 48. The sleeve 47, the two downwardly extending ears 46 and the radially extending flange 48 form a single integral part. First and second downwardly extending mounting assemblies 50 and 52 are secured to mounting apertures in the radially extending flange 48. The first mounting assembly 50 is provided with a first ball joint 54 and the second mounting assembly 52 is provided with a second ball joint 56. The ball joints 54 and 56 of the mounting assemblies 50 and 52 are orthogonal to one another and are located on the two transverse pivot axes defined by the ears of the respective yokes. First ball joint 54 of first mounting assembly 50 is positioned adjacent to the transverse pivot axis defined by the downwardly extending ears of the slip yoke 38. Similarly, the second ball joint 56 of the second mounting assembly 52 is positioned adjacent to the transverse pivot axis defined by the upwardly extending ears of the flanged yoke 36. By having the ball joints 54 and 56 in line with the orthogonal pivot axes, cross talk when operating the control lever 20 is minimized. It should be noted that the radially extending flange 48 may comprise a single segment as illustrated, or two segments each one defining a mounting aperture for the mounting assemblies.

The first ball joint 54 is coupled to a first link 58. The first link 58 is coupled to the first hydraulic control valve 24 by a first control valve ball joint 60. The second ball joint 56 is coupled to a second link 62. The second link 62 is coupled to the second hydraulic control valve 26 by a second control valve ball joint 64. Both control valve ball joints 60 and 64 are aligned with the shift axes of the respective control valve so that again cross talk between control operations is minimized.

The above discussion was focussed on controlling the first two operations by moving the control lever 20 fore-and-aft, and right and left. The third control operation is accomplished by twisting the control lever 20 manipulating a third mounting assembly 66. The third mounting assembly is coupled to the control lever 20 through a downwardly extending strap 70. The strap 70 is welded to the control lever 20. The third mounting assembly 66 comprises a third ball joint that is operatively coupled to a third linkage. The third linkage is defined by a control rod 72 having a first end that is coupled to the third ball joint of the third mounting assembly 66 and an opposite end having a fourth ball joint 74 that is coupled to the first arm 76 of a bell crank 78. The bell crank 78 is pivotally mounted to the supporting frame 12 and is provided with a second arm 80 that is coupled to a third link 82 that is pinned to control valve 28 by pin 84. It should be noted that the third control valve 28 may also be provided with a control valve ball joint in a manner similar to the first two control valves. But in the current application the third control function is not widely used and a pin joint is deemed adequate.

The invention should not be limited by the above described embodiments, but should be limited solely by the claims that follow.

We claim:

1. A three function control mechanism for a work vehicle, the mechanism comprising:

a control lever defining a lever axis;

a slip yoke for receiving the control lever, the slip yoke having two downwardly projecting ears that are parallel to the lever axis and a radially extending flange, the radially extending flange is provided with a first mounting assembly and a second mounting assembly;

a flanged yoke located below the slip yoke, the flanged yoke having two upwardly extending ears that are parallel to the lever axis;

a cross member is mounted to the downwardly extending ears of the slip yoke and the two upwardly extending ears of the flanged yoke for permitting the control lever and slip yoke to pivot about a first transverse axis relative to the lever axis and a second transverse axis relative to the lever axis, the first transverse axis and the second transverse axis being orthogonal to one another and are arranged so that the pivotal movement of the control lever in the first transverse axis will operate the first mounting assembly without operating the second mounting assembly and pivotal movement of the control lever in the second transverse axis will operate the second mounting assembly without operating the first mounting assembly;

a strap is coupled to the control lever and extends radially therefrom, the radially extending strap is provided with a third mounting assembly, the control lever can be twisted about the lever axis so that is rotates relative to the slip yoke;

the first mounting assembly is provided with a first link coupling the first mounting assembly to a first hydraulic valve, the second mounting assembly is provided with a second link coupling the second mounting assembly to a second hydraulic valve and the third mounting assembly is provided with a third linkage for coupling the third mounting assembly to a third hydraulic valve.

2. A control mechanism as defined by claim 1 wherein the slip yoke has an upward extending sleeve that is provided with a bore into which the control lever is received.

3. A control mechanism as defined by claim 2 wherein the downward extending ears, the flange and the sleeve of the slip yoke are a single integral part.

4. A control mechanism as defined by claim 2 wherein the first mounting assembly is provided with a first ball joint, the second mounting assembly is provided with a second ball joint and the third mounting assembly is provided with a third ball joint.

5. A control mechanism as defined by claim 4 wherein the third linkage comprises a bellcrank having a first arm that is coupled to the third mounting assembly by a rod and a second arm that is coupled to the third hydraulic valve by a third link.

6. A control mechanism as defined by claim 5 wherein the first and second links extend downwardly from the slip yoke and the third link extends downwardly from the bellcrank.

7. A control mechanism as defined by claim 6 wherein the first and second ball joints are in the same plane of the cross member and the first ball joint is aligned with the second transverse axis and the second ball joint is aligned with the first transverse axis.

8. A control mechanism as defined by claim 7 wherein the first control valve has a first shift axis and the first control valve is provided with a first control valve ball joint which is in line with the first shift axis and is coupled to the first link.

9. A control mechanism as defined by claim 8 wherein the second control valve has a second shift axis and the second control valve is provided with a second control valve ball joint which is in line with the second shift axis and is coupled to the second link.

10. A control mechanism as defined by claim 9 wherein the control lever is provided with a handle through which the lever axis passes and which extends radially outward from the lever axis.

11. A work vehicle for performing a work operation, the work vehicle comprising:

a supporting frame;

ground engaging means for supporting and propelling the supporting frame;

a working member for performing a work operation is operatively coupled to the supporting frame;

a three function control mechanism for controlling the working member, the mechanism comprising: a control lever defining a lever axis; a slip yoke for receiving the control lever, the slip yoke having two downwardly projecting ears that are parallel to the lever axis and a radially extending flange, the radially extending flange is provided with a first mounting assembly and a second mounting assembly; a flanged yoke located below the slip yoke is rigidly mounted to the supporting frame, the flanged yoke having two upwardly extending ears that are parallel to the lever axis; and a cross member is mounted to the downwardly extending ears of the slip yoke and the two upwardly extending ears of the flanged yoke for permitting the control lever and slip yoke to pivot about a first transverse axis relative to the lever axis and a second transverse axis relative to the lever axis, the first transverse axis and the second transverse axis being orthogonal to one another and are arranged so that the pivotal movement of the control lever in the first transverse axis will operate the first mounting assembly without operating the second mounting assembly and pivotal movement of the control lever in the second transverse axis will operate the second mounting assembly without operating the first mounting assembly; a radially extending strap is coupled to the control lever and extends radially from the control lever, the radially extending strap is provided with a third mounting assembly, the control lever can be twisted about the lever axis so that is rotates relative to the slip yoke; the first mounting assembly is provided with a first link coupling the first mounting assembly to a first hydraulic valve, the second mounting assembly is provided with a second link coupling the second mounting assembly to a second hydraulic valve and the third mounting assembly is provided with a third linkage for coupling the third mounting assembly to a third hydraulic valve.

12. A work vehicle as defined by claim 11 wherein the first mounting assembly is provided with a first ball joint, the second mounting assembly is provided with a second ball joint and the third mounting assembly is provided with a third ball joint.

13. A work vehicle as defined by claim 12 wherein the third linkage comprises a bellcrank that is pivotally coupled to the supporting frame, the bellcrank having a first arm that is coupled to the third mounting assembly by a rod and a second arm that is coupled to the third hydraulic valve by a third link.

14. A work vehicle as defined by claim 13 wherein the first and second links extend downwardly from the slip yoke and the third link extends downwardly from the bellcrank.

15. A work vehicle as defined by claim 14 wherein the first and second ball joints are in the same plane of the cross member and the first ball joint is aligned with the second transverse axis and the second ball joint is aligned with the first transverse axis.

16. A work vehicle as defined by claim 15 wherein the first control valve has a first shift axis and the first control valve is provided with a first control valve ball joint which is in line with the first shift axis and is coupled to the first link.

17. A work vehicle as defined by claim 16 wherein the second control valve has a second shift axis and the second control valve is provided with a second control valve ball joint which is in line with the second shift axis and is coupled to the second link.

18. A work vehicle as defined by claim 17 wherein the control lever is provided with a handle through which the lever axis passes and which extends radially outward from the lever axis.

19. A work vehicle for performing a work operation, the work vehicle comprising:

a supporting frame;

ground engaging means for supporting and propelling the supporting frame;

a working member for performing a work operation is operatively coupled to the supporting frame;

a control mechanism for controlling the working member, the mechanism comprising: a control lever defining a lever axis; a slip yoke for receiving the control lever, the slip yoke having two downwardly projecting ears that are parallel to the lever axis and a radially extending flange, the radially extending flange is provided with a first mounting assembly and a second mounting assembly; a flanged yoke located below the slip yoke is rigidly mounted to the supporting frame, the flanged yoke having two upwardly extending ears that are parallel to the lever axis; and a cross member is mounted to the downwardly extending ears of the slip yoke and the two upwardly extending ears of the flanged yoke for permitting the control lever and slip yoke to pivot about a first transverse axis relative to the lever axis and a second transverse axis relative to the lever axis, the first transverse axis and the second transverse axis being orthogonal to one another and are arranged so that the pivotal movement of the control lever in the first transverse axis will operate the first mounting assembly without operating the second mounting assembly and pivotal movement of the control lever in the second transverse axis will operate the second mounting assembly without operating the first mounting assembly; the first mounting assembly is provided with a first link coupling the first mounting assembly to a first hydraulic control valve, the first hydraulic control valve defines a first shift axis and is provided with a first control valve ball joint coupling the first link to the first hydraulic control valve, the first control valve ball joint being in line with the first shift axis, the second mounting assembly is provided with a second link coupling the second mounting assembly to a second hydraulic valve, the second hydraulic control valve defines a second shift axis and is provided with a second control valve ball joint coupling the second link to the second hydraulic control valve, the second control valve ball joint being in line with the second shift axis.

* * * * *